United States Patent Office 3,449,452
Patented June 10, 1969

3,449,452
HYDROGENATION OF CONDENSED NUCLEAR HYDROCARBONACEOUS COMPOUNDS
John G. Gatsis, Des Plaines, and William K. T. Gleim, Island Lake, Ill., assignors to Universal Oil Products Company, Des Plaines, Ill., a corporation of Delaware
No Drawing. Filed June 19, 1967, Ser. No. 647,231
Int. Cl. C07c 5/10
U.S. Cl. 260—667                                      6 Claims

ABSTRACT OF THE DISCLOSURE

The use of a halogen hydride, particularly selected from hydrogen chloride and hydrogen bromide, for effecting the hydrogenation of condensed ring aromatic hydrocarbons—i.e. the hydrogenation of naphthalene to tetralin and/or alkylbenzenes. Does not affect mononuclear aromatics, such as benzene and alkylbenzenes, which may be in the charge stream.

APPLICABILITY OF INVENTION

The present invention relates to the catalytic hydrogenation of condensed ring aromatic hydrocarbons. These are fused ring compounds wherein two or more carbon atoms are commonly shared by two or more aromatic rings. Exemplary of condensed ring aromatics are naphthalene, anthracene, phenanthrene, chrysene, pyrene, triphenylene, hexabenzobenzene and 1,2,3,4-dibenzpyrene. Other, still more complex polynuclear aromatics are known, and examples thereof may be found in the literature. These condensed ring systems are found as naturally-occurring compounds in petroleum crude oils, shale oils, tar sand oils, coal tar distillates, etc., and are often synthesized while effecting various hydrocarbon conversion processes such as reforming, catalytic and thermal cracking, etc.

The condensed ring structure is notoriously refractory with respect to further conversion; for example, the light cycle oil from a fluid catalytic cracking process is highly refractory to further cracking and cannot, therefore, be recycled to extinction within the process. Through the practice of the present invention, such fused rings are at least partially hydrogenated to form mononuclear aromatic hydrocarbons which can be further converted—i.e. by cracking, hydrocracking, etc.—to form lower-boiling hydrocarbons. As hereinafter indicated, with the higher order condensed ring structures such as anthracene and phenanthrene, the hydrogenated product can undergo further reaction to form alkylbenzenes. Significantly, any mononuclear aromatics, benzene, alkylbenzenes, toluene and isomeric xylenes, in the charge stock are unaffected, and may be recovered from the effluent as a separate product stream.

PRIOR ART

While it must be acknowledged that the prior art contains examples of various schemes for effecting the catalytic hydrogenation of polynuclear condensed aromatics, it must likewise be noted that the hydrogenation is effected in a reaction zone containing a fixed bed of a solid hydrogenation catalyst. Typical of such processes are those of U.S. Patent Nos. 3,203,889 (Cl. 208–57), 3,203,-890 (Cl. 208–58) and 3,132,086 (Cl. 208–112). The catalytic composites employed therein generally consist of at least one metal from Groups VI and VIII of the Periodic Table and a refractory inorganic oxide carrier material. While such processes may be advantageous and practical for effecting the saturation of condensed ring aromatics, there appears to be either no concern for the mononuclear aromatics and alkylbenzenes. Thus, the prior art processes simultaneously cause at least partial hydrogenation of the mononuclear aromatics, including alkyl-substituted compounds, with the result that these valuable hydrocarbons are lost via further conversion such as ring-opening.

To the contrary, the use of our invention for the hydrogenation of polynuclear aromatics has no effect upon the mononuclear aromatics, and the same are thus preserved for subsequent recovery. Furthermore, the utilization of halogen hydrides causes those condensed ring structures of three or more rings, to undergo further reaction such that the hydrogenated counterpart is transformed into an alkyl-substituted mononuclear aromatic compound.

An object, therefore, of the present invention is to hydrogenate, at least partially, condensed ring aromatic hydrocarbons. A corollary objective is to hydrogenate a condensed ring hydrocarbonaceous charge stock which contains mononuclear aromatics and/or alkylaromatics, without affecting the aromatic nucleus of said mononuclear aromatic hydrocarbons.

Another object of our invention is to convert polynuclear aromatic hydrocarbons into mononuclear aromatic hydrocarbons, and, in the case of three or more fused rings, to produce alkylbenzenes.

These and other objects of our invention are attained through the utilization of an embodiment which encompasses a process for hydrogenating condensed nuclear hydrocarbons which comprises reacting said condensed nuclear hydrocarbons with hydrogen in contact with a halogen hydride selected from hydrogen chloride and hydrogen bromide.

As hereinabove set forth, many condensed ring aromatics are found in admixture with mononuclear aromatics including benzene, toluene, xylene and alkylbenzenes. Since these compounds have significant value, it is to great advantage to retain the mononuclears in the product effluent while producing mononuclear aromatic compounds from the condensed ring structures. Therefore, the present invention affords an improvement in a process for catalytically hydrogenating a hydrocarbon mixture containing mononuclear aromatic hydrocarbons and condensed nuclear aromatic hydrocarbons, in which process the hydrogenation of mononuclear aromatic hydrocarbons is effected, the improvement which comprises reacting said mixture with hydrogen at hydrogenating conditions and in contact with a halogen hydride selected from hydrogen chloride and hydrogen bromide, and recovering a product effluent rich in mononuclear aromatic hydrocarbons.

SUMMARY OF THE INVENTION

From the foregoing embodiments, it will be noted that the present invention is directed toward a scheme for converting condensed, or fused ring hydrocarbons to a form more readily susceptible to conversion into lower-boiling, more valuable hydrocarbons, and specifically mononuclear aromatic hydrocarbons. In the case of naphthalene, the end product is tetralin and alkylbenzenes, the former in the greater concentration. With polynuclear aromatics of three or more condensed rings, such as anthracene, the end product is an alkylbenzene. It is well known that the condensed ring hydrocarbons are highly refractory and extremely difficult to convert into lower-boiling compounds, for example, by subjecting the same to hydrocracking. Therefore, our invention affords advantages when employed as an integral part of a cracking and/or hydrocracking process.

An unexpected advantage, arising out of an unusual result, stems from the fact that the practice of the present concept does not affect the aromatic nucleus of benzene, toluene, isomeric xylenes and various alkylbenzenes.

Briefly, the present invention involves contacting the condensed ring hydrocarbon, or a mixture thereof, with a halogen hydride selected from hydrogen chloride and hydrogen bromide. Hydrogen is recycled in an amount of from 3,000 to 20,000 s.c.f./bbl., and the halogen hydride in an amount of from 0.5% to about 20.0% by weight of the total charge. Of the halogen hydrides, hydrogen bromide is particularly preferred, over hydrogen chloride, considering the results obtained, although hydrogen chloride is suitable for use with the present concept. On the other hand, hydrogen fluoride does not effect the desired reactions at operating conditions which are reasonably considered economically feasible, and hydrogen iodide gives rise to operational difficulties. At temperatures and pressures which would foster thermal cracking reactions, hydrogen fluoride has too much of an effect, and a large portion of the charge is polymerized to solids.

Suitable hydrogenating conditions are employed, and include temperatures above about 300° C., preferably from 325° C. to about 500° C. Likewise, the pressure under which the reactions are effected is greater than 900 p.s.i.g. and preferably in the range of 1,000 to 5,000 p.s.i.g. An excess of hydrogen is desirable, and is admixed with the charge stock and halogen hydride in an amount of 3,000 to about 20,000 s.c.f./bbl. The halogen hydride, in an amount of from 0.5% to about 20.0% by weight of the total charge stock, is preferably added with the hydrogen stream prior to admixture with the charge stock. The reaction zone may be provided with Berl saddles, granite, porcelain, sand, or other refractory turnings to facilitate distribution of the reactants, or the zone may be supplied with mechanical devices for this purpose—i.e. perforated trays, side-to-side pans, etc.

EXAMPLES

The hydrogenation of Decalin, Tetralin, napthalene, anthracene, phenanthrene and pyrene was studied. Decalin and Tetralin are the DuPont Company's registered trademarks for decahydronaphthalene and 1,2,3,4-tetrahydronaphthalene, respectively. In each operation, ten (10) grams of hydrogen bromide was added to the amount of the charge stock stated below. The charge and hydrogen bromide were plased in an 1,800-cc. capacity rocker-type autoclave, pressured to about 100 atmospheres with hydrogen, and raised to a temperature of 400° C., the final pressure being about 215 atmospheres. These conditions were maintained for four (4) hours, at the end of which period the autoclave was depressured and cooled, and the contents analyzed by gas liquid chromatographic analysis.

With 100.0 grams of Decalin (HBr concentration of 10.0% by weight) the product analyzed 72.2% t-decalin, 21.1% c-decalin and 2.3% Tetralin, with a total of 0.4% by weight being recovered in substantially equal quantities at 85° C., 102° C., 155° C. and 168° C. Utilizing 100 grams of Tetralin as the charge stock, with the 10 grams of hydrogen bromide, the effluent was found to contain 92.6% Tetralin and 1.1% of Decalin. Of the remainder 4.0% was recovered at a temperature of 179° C., and 2.3% at various lower-boiling points indicative of alkylbenzenes—i.e. 0.5% at 98° C. and 0.4% at 176° C. This data indicates that the halogen hydride has substantially no effect of Tetralin and Decalin.

Utilizing 100.0 grams of naphthalene in admixture with 100.0 grams of Decalin, the latter serving solely as a diluent, under the conditions previously set forth, the product effluent analyzed as shown in the following Table I, the values being given in weight percent.

Table I

| Boiling point, ° C.: | Wt. percent |
|---|---|
| 85–164 | 1.0 |
| 168 | 0.7 |
| 176 | 0.7 |
| 1-Decalin | [1] 37.5 |
| c-Decalin | [1] 7.8 |
| Tetralin | 34.1 |
| Napathalene | 17.0 |
| 222–254 | 0.7 |
| 277–316 | 0.5 |

[1] Represents 90.6 grams of Decalin.

It will be noted that 66.0% of the naphthalene has been hydrogenated, and that virtually all of this to Tetralin (68.2 grams). With respect to the 1.2% of the product effluent boiling above napathalene (218° C.), this apparently represents impurities in the fresh charge stock.

In an experiment using 50.0 grams of phenanthrene and 100.0 grams of Decalin, the product analyzed as shown in the following Table II:

Table II

| Boiling point, ° C.: | Wt. percent |
|---|---|
| 164–176 | 0.8 |
| t-Decalin | [1] 58.7 |
| c-Decalin | [1] 9.7 |
| Tetralin | 1.8 |
| Napthalene | 0.5 |
| 254–281 | 1.0 |
| 286.8–296 | 2.5 |
| 300 | 4.9 |
| 308 | 4.3 |
| 316 | 14.8 |

[1] Represents approximately 1.4% more Decalin than in the charge stock.

Significantly, no trace of phenanthrene was found in the product effluent indicating complete reduction thereof to lower-boiling hydrocarbons principally alkylbenzenes as indicated by the boiling points.

With a charge stock consisting of 50.0 grams of pyrene and 100.0 grams of Decalin, the effluent product analyzed as shown in the following Table III:

Table III

| Boiling point, ° C.: | Wt. percent |
|---|---|
| 68.7–176 | 0.8 |
| t-Decalin | [1] 58.1 |
| c-Decalin | [1] 12.8 |
| Tetralin | 1.3 |
| Naphthalene | 0.1 |
| 270–308 | 1.3 |
| 316 | 1.0 |
| 321 | 1.9 |
| 329.7 | 1.2 |
| 335 | 2.4 |
| 337.5 | 5.3 |
| 342.7 | 6.0 |
| Pyrene | 7.8 |

[1] Represents a 4.2% increase in Decalin.

The foregoing specification, and especially the examples, illustrates the method by which condensed ring aromatics are hydrogenated in accordance with the present invention, and clearly indicates the benefits afforded through the utilization thereof.

We claim as our invention:

1. A process for hydrogenating a condensed nuclear hydrocarbon to produce a lower-boiling hydrocarbon which comprises reacting said condensed nuclear hydrocarbon with hydrogen in contact with a halogen hydride selected from hydrogen chloride and hydrogen bromide.

2. The process of claim 1 further characterized in that said halogen hydride is hyrogen bromide.

3. The process of claim 1 further characterized in that said halogen hydride is hydrogen chloride.

4. The process of claim 1 further characterized in that said condensed nuclear hydrocarbon is in contact with from 0.5% to about 20.0% by weight of a halogen hydride.

5. In a process for catalytically hydrogenating a hydrocarbon mixture containing mononuclear aromatic hydrocarbons and condensed nuclear aromatic hydrocarbons, in which process the hydrogenation of mononuclear aromatic hydrocarbons is not effected, the improvement which comprises reacting said mixture with hydrogen at hydrogenating conditions and in contact with a halogen hydride selected from hydrogen chloride and hydrogen bromide, and recovering a lower-boiling product effluent containing mononuclear aromatic hydrocarbons.

6. The improvement of claim 5 further characterized in that said hydrocarbon mixture is reacted with hydrogen in contact with from about 0.5% to about 20.0% by weight of said halogen hydride.

References Cited
UNITED STATES PATENTS

| | | | |
|---|---|---|---|
| 3,091,649 | 5/1963 | Schneider | 260—667 |
| 3,344,200 | 9/1967 | Wald et al. | 260—667 |

DELBERT E. GANTZ, *Primary Examiner.*

C. R. DAVIS, *Assistant Examiner.*

U.S. Cl. X.R.

260—668, 674